July 8, 1924.

R. H. ROVER

SUPPORT FOR CORRUGATED HEATING ELEMENTS

Filed Aug. 23, 1922

1,500,895

Inventor
Richard H. Rover
By his Attorneys
Cooper, Kerr & Dunham

Patented July 8, 1924.

1,500,895

UNITED STATES PATENT OFFICE.

RICHARD H. ROVER, OF DANSVILLE, NEW YORK, ASSIGNOR TO POWER SPECIALTY COMPANY, OF NEW YORK, N. Y., A CORPORATION OF NEW YORK.

SUPPORT FOR CORRUGATED HEATING ELEMENTS.

Application filed August 23, 1922. Serial No. 583,772.

*To all whom it may concern:*

Be it known that I, RICHARD H. ROVER, a citizen of the United States of America, residing at Dansville, in the county of Livingston and State of New York, have invented certain new and useful Improvements in Supports for Corrugated Heating Elements, of which the following is a full, clear, and exact description.

This invention relates to an improved construction for supporting the tubes of an economizer, superheater or like heating device wherein corrugated cast iron casings are employed upon the tubes to protect the same and absorb heat from the hot gases.

In such devices provision is usually made for removing the tubes which necessitate the passing of the corrugated sections through the walls of the device. With thin single plate wall sections it has been found that the plates catch upon the corrugations and impede the withdrawal of the tubes.

The present invention is directed to an improved means for supporting the tubes whereby withdrawal of the same may be more readily effected.

Figure 1:
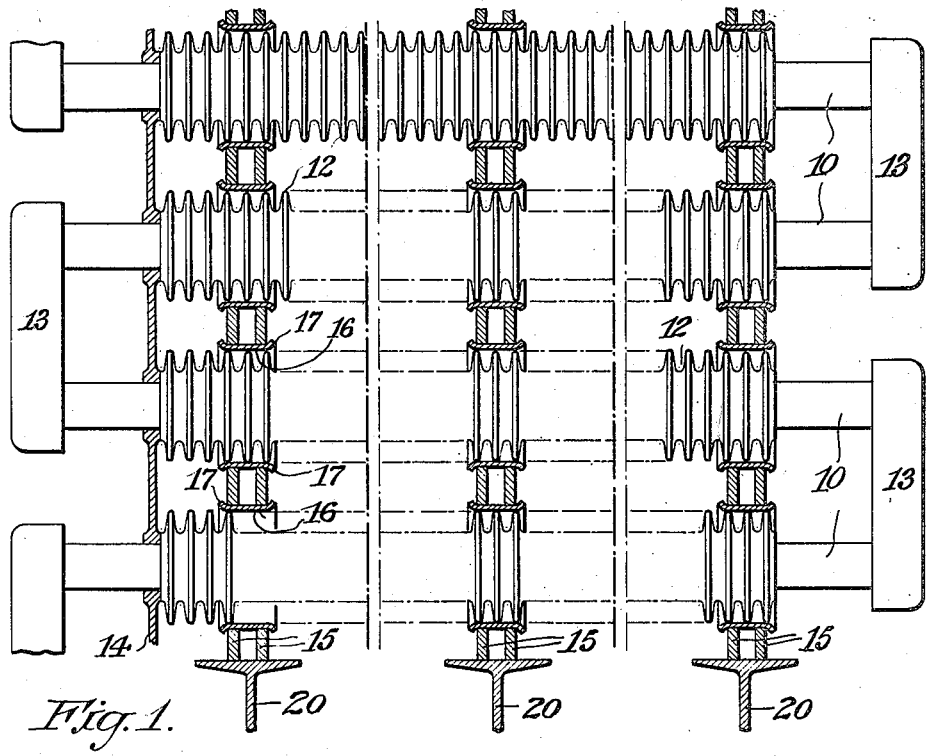
Fig. 1 is a cross sectional view of an economizer or like device with my improved tube supporting structure.
Figure 2:
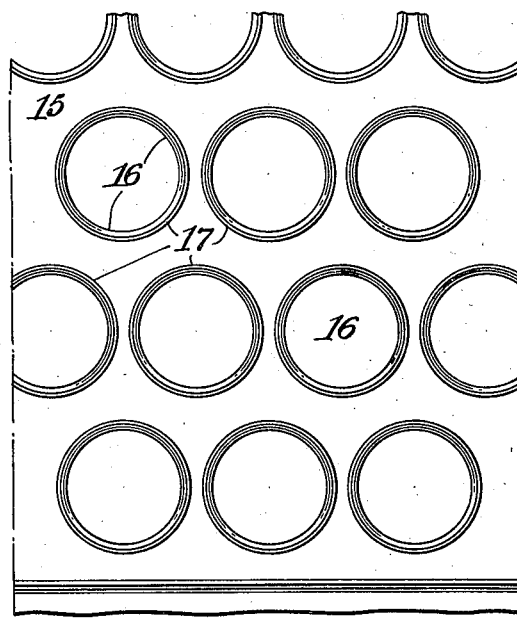
Fig. 2 is a detail side view of one of the tube supports.

In more detail, the device comprises a plurality of superimposed tubes 10 provided with the usual corrugated cast iron casings 12 and connected by suitable headers or couplings 13.

One wall of the device may be in the form of a plate 14 suitably perforated to directly receive the tubes 10. The opposite wall and the intermediate supporting walls preferably comprise two spaced plates 15 which are suitably apertured to receive collars 16 which, in turn, support the corrugated tubular elements. The plates 15 may be supported in any desired manner as by beams 20.

The length of the collars 16 is such as to bridge at least two adjacent corrugations so that at least one corrugation of each casing will at all times rest upon the collars thereby preventing the sagging of the corrugated tubular heating elements during withdrawal or replacement. By preventing the sagging of the tubes the corrugations are prevented from catching upon the edges of the supporting plates.

To facilitate the withdrawal and insertion of the corrugated tubular elements, the collars 16 are provided with flaring flanged portions 17. When the tubes are being withdrawn or replaced, these flaring flanged portions serve to guide the corrugated casings into the narrower portion of the collars and thereby obviate the catching of the corrugations upon the edges of the collars.

It will be understood that suitable heat insulating packing may be provided outside the outer walls and in addition the usual inlet and outlet headers are provided. Such details form no part of the present invention and are therefore not shown.

When the tubular elements are in position the collars 16 form a close fit about the periphery of the corrugated casings and prevent the leakage of hot gases through the side walls.

What I claim is:

1. A support for corrugated tubular heating elements comprising a pair of spaced apertured plates, and collar-like members carried thereby and fitted in the apertures therein to support said elements, said collars having outwardly flaring flanged portions to guide the corrugated portions into the supporting collars.

2. A support for a corrugated tubular heating element comprising a pair of spaced apertured plates, means for supporting the same, and collars carried thereby within said apertures and connecting the plates to form a support for the corrugated casings.

3. A support for a corrugated tubular heating element comprising a plate-like supporting structure having a plurality of spaced plates with aligned apertures thereon, collars carried thereby within said apertures and connecting said plates, said collars having a width sufficient to engage at least two adjacent corrugations of the heating element whereby sagging of the latter during withdrawal or replacement is obviated.

4. A support for corrugated tubular heating elements comprising a plurality of apertured plate-like members, certain of said members carrying collars fitted in corresponding apertures of adjacent plates to receive the corrugated portions of the heating elements, said collars having a width sufficient to bridge adjacent corrugations and thereby prevent the sagging of elements upon the longitudinal displacement of said elements.

In testimony whereof, I hereunto affix my signature.

RICHARD H. ROVER.